Dec. 2, 1952  R. B. HARDING  2,620,185
CLIMBING AND SLIDING APPARATUS
Filed Jan. 30, 1951  2 SHEETS—SHEET 1
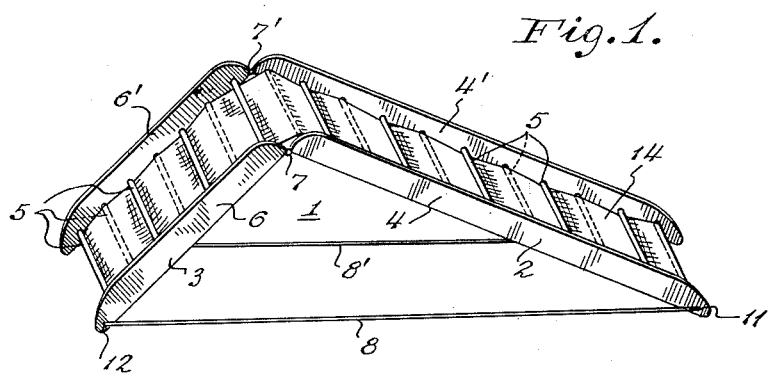
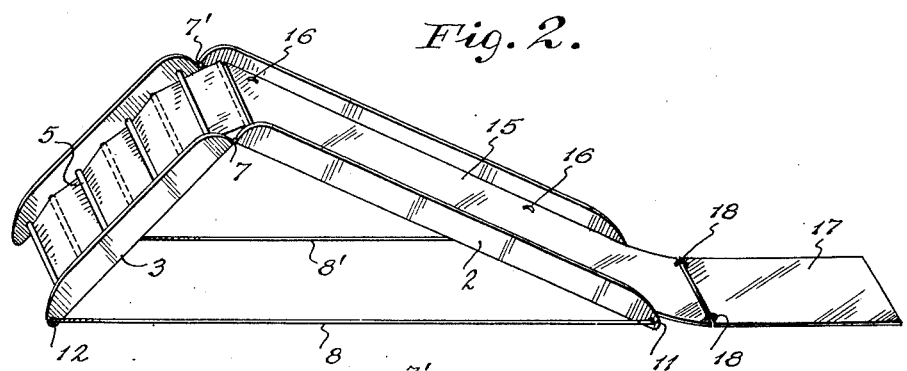
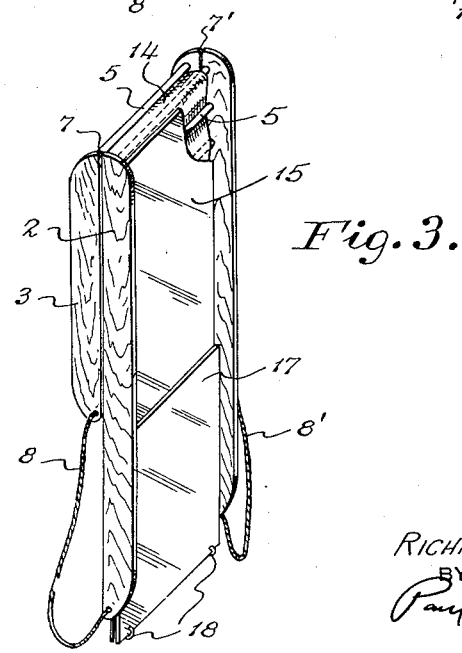
INVENTOR
RICHARD B. HARDING
BY
Paul B. Hunter
ATTORNEY Dec. 2, 1952  R. B. HARDING  2,620,185
CLIMBING AND SLIDING APPARATUS
Filed Jan. 30, 1951  2 SHEETS—SHEET 2
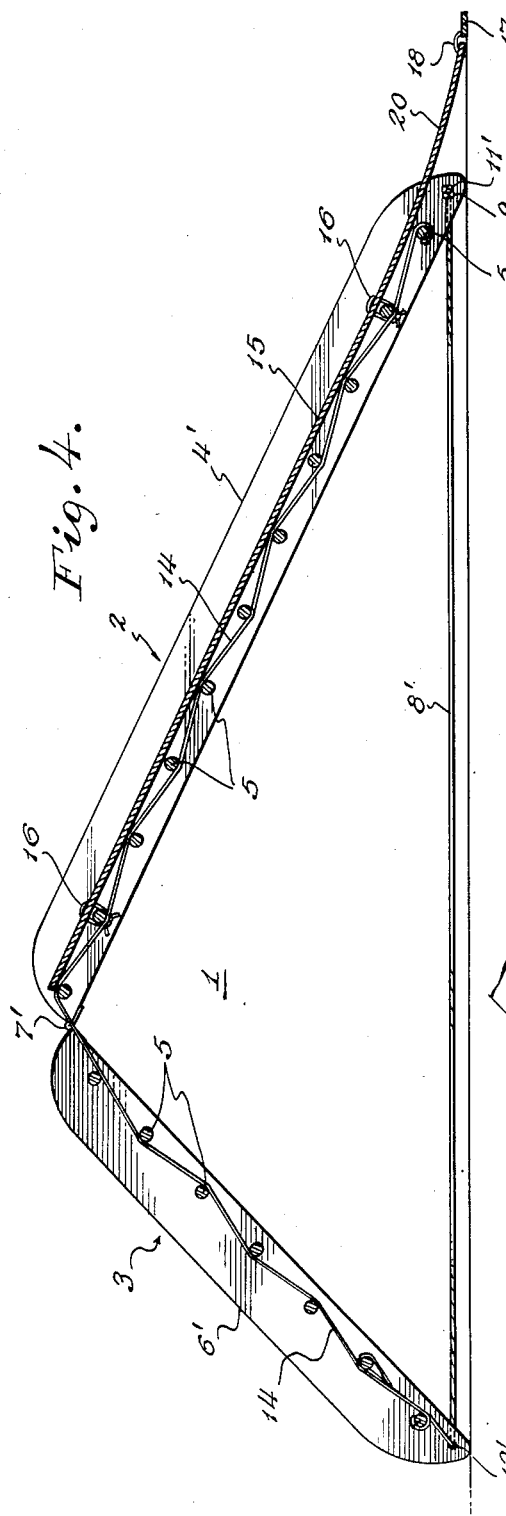
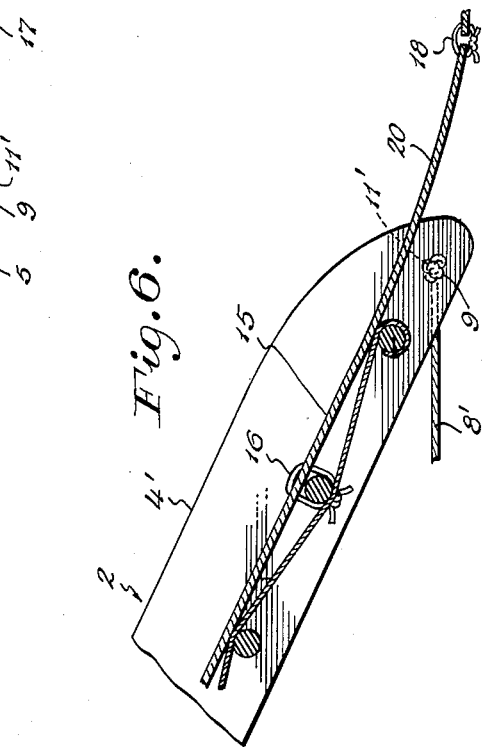
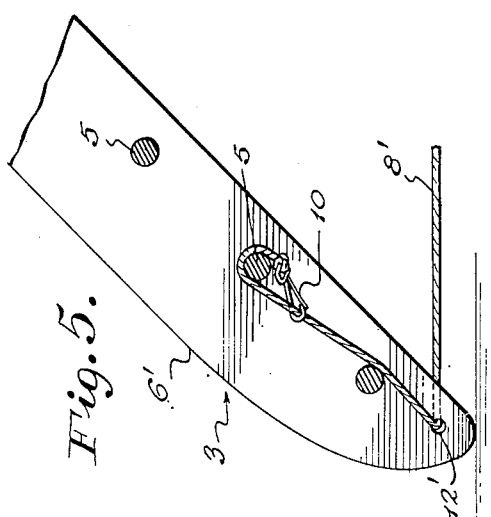
INVENTOR
RICHARD B. HARDING
BY
Paul B. Hunter
ATTORNEY Patented Dec. 2, 1952

2,620,185

UNITED STATES PATENT OFFICE 2,620,185

CLIMBING AND SLIDING APPARATUS

Richard B. Harding, New Hyde Park, N. Y.

Application January 30, 1951, Serial No. 208,541

6 Claims. (Cl. 272—56.5)

This invention relates generally to amusement and muscular development devices, and the invention has reference, more particularly, to a novel muscular development or infant climbing and sliding apparatus especially suitable for the amusement and muscular development of young children in the age group of from less than one year to three years or more.

Heretofore, amusement devices employing slides have generally been suitable for children of four years and older, and such devices have not been thought practical for use by very young children. The reason for this is that these devices generally employ stairs, ladders, or hand-grips, etc., which, while suitable for older children to use in climbing to the top of the slide, are not suitable for very young children who are apt to fall and hurt themselves on such equipment. Also, young children are very apt to let their feet slide through the openings in ladders and stairs resulting in injury, or to fall on the same and on hand-grips and cleat devices when used, also resulting in injury. Furthermore, heretofore, these devices have been rather large and bulky, and generally only suitable for out-door use.

The principal object of the present invention is to provide a novel infants' climbing and sliding apparatus, especially adapted for the amusement and muscular development and co-ordination of young children in the age group of less than one year to three years or more, the said apparatus employing mutually spaced wooden cross members or rungs with canvas or other flexible web material threaded or woven through the rungs, whereby a child can easily grasp a rung in his effort to climb to the top of the apparatus, and at the same time his feet and hands cannot fall or slip downwardly through the spaces between the rungs because of the presence of the canvas or other flexible web material threaded through the rungs.

Another object of the present invention is to provide a novel infants' sliding and climbing apparatus which is readily adjustable as to height, and hence as to slant angle, so that older children can climb to greater heights than smaller children, and which device is easily foldable into a compact form when not in use.

Still another object of the present invention is to provide a novel infants' climbing and sliding apparatus which can be adapted for use as a climbing device alone, if desired, as in the training of young children, to climb and develop their muscular co-ordination; or the device may be used as a combination climbing and sliding device, especially where the child has attained the age and proficiency adapting him to use a slide, such slide being readily removable from the apparatus at will.

Another object of the present invention is to provide a novel apparatus of the above character which is suitable for use indoors as well as outdoors, and which is of extremely simple construction and requires no fasteners in order to set up the device ready for use.

Other objects and advantages of the invention will become apparent as the description proceeds.

In the drawings:

Fig. 1 is a perspective view of the novel infant climbing and sliding device of the present invention, shown with the slide removed.

Fig. 2 is a view similar to Fig. 1, but shown with the slide attached.

Fig. 3 is a folded view, showing the apparatus in position for storing or carrying.

Fig. 4 is a longitudinal vertical sectional view of the invention as shown in Fig. 2.

Fig. 5 is a fragmentary view of a portion of the structure shown in Fig. 4, and Fig. 6 is a fragmentary view of another portion of the structure shown in Fig. 4.

Referring now to Fig. 1, reference numeral 1 designates the novel climbing and sliding device of this invention which is shown as comprising essentially two sections which are hinged together, one section 2 being longer than the other section 3. The hinged section 2 comprises spaced side rails 4 and 4' which are interconnected by mutually spaced cross members or rungs 5 which rungs are disposed at right angles to the rails 4 and 4' in the manner of the rungs of a ladder. Similarly, the short hinged section 3 is formed with spaced side rails 6 and 6' which are interconnected by mutually spaced rungs 5 just as in the case of section 2. The side rails 4 and 6, and 4' and 6', of the sections 2 and 3 are hinged together at their adjacent ends by hinges 7 and 7' while the other ends of these side rails are connected together by flexible members or ropes 8 and 8'.

The ropes 8 and 8' are shown as having similar ends thereof respectively passed through apertures 11 and 11' in the side rails 4 and 4' and retained therein against removal by knots 9 formed on the ends of these ropes. The other ends of the ropes pass through apertures 12 and 12' in side rails 6 and 6' of short section 3 and then extend upwardly along the side rails of this section, and then over one of the rungs 5 thereof, and have their ends attached to harness snaps 10 which are snapped over the ropes 8 and 8' as especially shown in Fig. 5. By releasing the harness snaps 10, these ends of the ropes may be adjusted to surround higher or lower cross members or rungs 5 to thereby correspondingly raise or lower the apparatus so that the steepness of the long and short sections is varied at will in this manner.

A web 14 of canvas or similar heavy cloth material is threaded or woven in between the cross members or rungs so as to overlie one rung and underlie the next succeeding rung, as best shown in Fig. 4. This fabric web is interlaced fairly snugly between the rungs 5 when the apparatus is set up for use as shown in Fig. 4, and has its ends fastened as by tacking to the lowermost rungs 5 of the long and short sections 2 and 3. The web is not so snug however as to prevent a child from readily inserting his fingers between the web and a rung as when grasping the rung to climb up either of the sections 2 or 3. However, there is not sufficient slack between the rungs and the web to permit him to slide his foot between the rung and the web, so that, although he is able to get a good hand or toe hold on the rung, he cannot accidentally slip his hand or foot down between alternate rungs of the web. Also, the rungs which are covered by the web afford a good toe-hold support due to some give in the web when pressure is applied by the foot.

The presence of the side rails 4, 4' and 6, 6' prevent the child from falling over the sides of the device while he is climbing or descending the sections 2 and 3. For very young children, the device would ordinarily be used as shown in Fig. 1 to teach them how to climb and descend through the aid of the cross members or rungs 5 and the webbing threaded therethrough, the webbing preventing the child's hands or feet falling down between the rungs which would otherwise result in possible injury to the child. As the child grows older, the slide panel 15 shown especially in Figs. 2, 4, and 6, can be employed, down which the child can slide after climbing to the top of the short section 3. The slide 15 is of semi-flexible material such as "Masonite," and may be attached simply by use of short pieces of light rope 16 which are looped through pairs of apertures in the slide 15, and are tied around certain of the rungs 5, as especially shown in Figs. 4 and 6. The length of the slide panel 15 is shown slightly longer than the length of the long hinged section 2 which allows the upper surface of this slide 15 to have a concave bend therein at 20 adjacent to the floor or ground to permit the user to readily slide on to the floor or ground surface without injury. If the apparatus is to be used upon a smooth floor such as linoleum, the child can slide directly from the slide 15 onto the floor; however, in the event that the floor is covered by a rug, a smooth extension piece 17 is provided which can be attached to the slide 15 as by light rope loops 18 particularly shown in Fig. 6, which loops pass through apertures in the slide 15 and in extension piece 17.

In use, the apparatus is set up as shown in Figs. 1, 2, and 4, the height of the apparatus being determined by the particular cross rung 5 of the short section 3 over which the ropes 8 and 8' are looped and held by harness snaps 10. Owing to the use of these harness snaps, the child cannot release the device so that there is no chance of the same collapsing. Also, as heretofore pointed out, the presence of the web or fabric 14 prevents the child from injuring himself in climbing up one section and down the other section of the apparatus as he cannot slip his legs or arms downwardly between successive cross members or rungs 5 and yet he is free to grasp these rungs with his hands and with his toes in ascending or descending the apparatus. When the slide 15 is attached as shown in Fig. 2, the apparatus can then be used not only as a climbing device but also as a slide.

When not in use the apparatus can be readily folded into compact form as shown in Fig. 3 of the drawings, and stored away in a limited space. The device is particularly suitable for use indoors where space is at a premium and can likewise be stored in a small space, although the apparatus is equally useful outdoors, if desired.

It will be noted that there are no fasteners required to set up the device, and the only time the harness snaps 10 are adjusted is when it is desired to change the height of the apparatus.

The apparatus of this invention is useful not only as a climbing and sliding device, but is also useful as a tunnel, or for rolling balls down the slide as well as wheeled toys.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A muscular development apparatus comprising a pair of sections having spaced side rails interconnected by mutually spaced cross members, said sections being hingedly connected together at their inner ends and having tensile members interconnecting their outer ends so that said sections may be set up in inclined positions, and a flexible web member woven between the cross members of said side rails and extending from one end portion of the apparatus to the other thereof, said web member having its ends connected to said end portions so as to provide a continuous flexible support running along substantially the entire lengths of said sections, said web member being fairly snug and co-operating with said cross members to facilitate the ready climbing of the apparatus, by permitting a child to readily insert his fingers or toes between the cross members and said web member while preventing his hand or foot from accidentally sliding therebetween.

2. A muscular development apparatus comprising a pair of connected hinged sections, one of said sections being longer than the other, said sections comprising spaced side rails interconnected by a series of mutually spaced cross members, a flexible web member snugly threaded in between successive cross members and extending the lengths of said sections and having its ends attached to the outer ends of said sections to provide a continuous flexible support therealong; and tie members interconnecting the lower ends of the side rails of said sections for retaining the apparatus in upright position with said connected sections oppositely inclined, said web member cooperating with said cross members to facilitate the ready climbing of the apparatus, by permitting a child to readily insert his fingers or toes between the cross members and said web member while preventing his hand or foot from accidentally sliding therebetween.

3. A muscular development apparatus as defined in claim 2 wherein said tie members comprise ropes attached at corresponding ends to the lower ends of the longer section side rails and having their other end portions extending through apertures in the lower portion of the short section side rails and upwardly therefrom into overlying and secured relation with respect to a cross member of said short section.

4. A muscular development apparatus comprising a climbing section consisting of spaced side rails and interconnecting mutually spaced cross members, a second climbing section longer than the first and also comprising spaced side rails and mutually spaced cross members interconnecting said side rails, hinged members interconnecting adjacent ends of said short and long sections, adjustable tensile members interconnecting the other ends of said sections whereby the latter may be set up to selected heights in oppositely inclined positions, and a flexible web member having its ends attached to the lowermost cross members of said sections and extending upwardly so as to be woven snugly through consecutive cross members of said sections, said web member overlying alternative cross members and underlying the remainder, said web member cooperating with said cross members to facilitate the ready climbing of the apparatus, by permitting a child to readily insert his fingers or toes between the cross members and said web member while preventing his hand or foot from accidentally sliding therebetween.

5. A muscular development apparatus as defined in claim 4 wherein a removable semi-stiff slide panel is supported upon the cross members of said long section, said slide panel being longer than said long section to provide a lower exit surface extending beyond said long section and having less steepness than the main portion of the slide panel.

6. A muscular development apparatus as defined in claim 4 wherein a slide member is removably attached to the upper surface of said long section, said slide member having a removable extension piece adapted to extend beyond said section for resting on the floor or other supporting surface.

RICHARD B. HARDING.

REFERENCES CITED

The following references are of record in the file of this patent:

UNITED STATES PATENTS

| Number | Name | Date |
|---|---|---|
| 880,964 | Boyle | Mar. 3, 1908 |
| 1,822,786 | Raffo | Sept. 8, 1931 |
| 2,012,195 | Husted | Aug. 20, 1935 |
| 2,365,117 | Stafford et al. | Dec. 12, 1944 |
| 2,482,637 | Podvinecz et al. | Sept. 20, 1949 |